(12) United States Patent
Park et al.

(10) Patent No.: US 11,391,478 B2
(45) Date of Patent: *Jul. 19, 2022

(54) BUILDING AUTOMATION SYSTEM WITH MICROSERVICES ARCHITECTURE

(71) Applicant: Johnson Controls Tyco IP Holdings LLP, Milwaukee, WI (US)

(72) Inventors: Youngchoon Park, Brookfield, WI (US); Vaidhyanathan Venkiteswaran, Brookfield, WI (US); Sudhi R. Sinha, Milwaukee, WI (US); Karl F. Reichenberger, Mequon, WI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 8 days.

This patent is subject to a terminal disclaimer.

(21) Appl. No.: 16/919,909

(22) Filed: Jul. 2, 2020

(65) Prior Publication Data

US 2021/0025609 A1 Jan. 28, 2021

Related U.S. Application Data

(63) Continuation of application No. 15/901,571, filed on Feb. 21, 2018, now Pat. No. 10,712,032.
(Continued)

(51) Int. Cl.
*F24F 11/30* (2018.01)
*G05B 15/02* (2006.01)
(Continued)

(52) U.S. Cl.
CPC .............. *F24F 11/30* (2018.01); *F24F 3/044* (2013.01); *F24F 11/49* (2018.01); *F24F 11/54* (2018.01);
(Continued)

(58) Field of Classification Search
CPC .. F24F 11/30; F24F 3/044; F24F 11/49; F24F 11/54; F24F 11/64; F24F 11/58;
(Continued)

(56) References Cited

U.S. PATENT DOCUMENTS 6,487,457 B1 * 11/2002 Hull ....................... G05B 15/02
700/17
9,363,301 B2 6/2016 Lawson et al.
(Continued)

FOREIGN PATENT DOCUMENTS

CN 105162884 12/2015

*Primary Examiner* — Thomas C Lee
*Assistant Examiner* — Michael Tang
(74) *Attorney, Agent, or Firm* — Foley & Lardner LLP

(57) ABSTRACT

A building automation system (BAS) platform includes one or more processors configured to provide an operating environment for developing and executing a plurality of building automation and control microservices. At least one of the plurality of building automation and control microservices is configured to receive live data from remote building equipment and provide control signals to the remote building equipment. The BAS platform further includes one or more application programming interfaces configured to interact with third-party building automation and control applications that run within the operating environment.

17 Claims, 6 Drawing Sheets

Related U.S. Application Data

(60) Provisional application No. 62/461,744, filed on Feb. 21, 2017.

(51) Int. Cl.

| | | |
|---|---|---|
| *F24F 11/49* | (2018.01) | |
| *F24F 11/54* | (2018.01) | |
| *F24F 11/64* | (2018.01) | |
| *F24F 11/58* | (2018.01) | |
| *F24F 3/044* | (2006.01) | |
| *F24F 120/10* | (2018.01) | |
| *F24F 120/20* | (2018.01) | |

(52) U.S. Cl.
CPC .............. *F24F 11/58* (2018.01); *F24F 11/64* (2018.01); *G05B 15/02* (2013.01); *F24F 2120/10* (2018.01); *F24F 2120/20* (2018.01); *F24F 2221/02* (2013.01); *F24F 2221/44* (2013.01); *G05B 2219/2642* (2013.01)

(58) Field of Classification Search
CPC .............. F24F 2221/44; F24F 2120/10; F24F 2120/20; F24F 2221/02; G05B 15/02; G05B 2219/2642
See application file for complete search history.

(56) References Cited

U.S. PATENT DOCUMENTS

| | | | |
|---|---|---|---|
| 9,571,986 B2* | 2/2017 | Gottschalk | H04W 4/33 |
| 9,690,268 B2* | 6/2017 | Wehrli | H04L 41/08 |
| 9,838,376 B1 | 12/2017 | Lander et al. | |
| 9,852,387 B2* | 12/2017 | Nair | G06Q 10/06 |
| 2004/0239494 A1* | 12/2004 | Kennedy | G06Q 30/02 |
| | | | 340/500 |
| 2005/0038869 A1* | 2/2005 | Zimler | G06F 15/16 |
| | | | 709/217 |
| 2010/0281387 A1 | 11/2010 | Holland et al. | |
| 2010/0299437 A1 | 11/2010 | Moore | |
| 2011/0160878 A1* | 6/2011 | Gutha | G06F 3/0481 |
| | | | 700/83 |
| 2014/0156097 A1* | 6/2014 | Nesler | H02J 13/00004 |
| | | | 700/295 |
| 2016/0320760 A1* | 11/2016 | Brun | G05B 19/042 |
| 2017/0192414 A1* | 7/2017 | Mukkamala | H04L 63/0876 |
| 2018/0087793 A1* | 3/2018 | Okita | G05B 19/042 |
| 2018/0113799 A1* | 4/2018 | M.V | G06F 11/3684 |
| 2018/0227369 A1* | 8/2018 | DuCray | H04L 12/403 |
| 2018/0234519 A1* | 8/2018 | Boyapalle | H04L 41/0806 |
| 2019/0327135 A1* | 10/2019 | Johnson | H04L 67/34 |

* cited by examiner

BUILDING AUTOMATION SYSTEM WITH MICROSERVICES ARCHITECTURE

CROSS-REFERENCE TO RELATED PATENT APPLICATIONS

This application is a continuation of U.S. patent application Ser. No. 15/901,571 filed Feb. 21, 2018, which claims the benefit of and priority to U.S. Provisional Patent Application No. 62/461,744 filed Feb. 21, 2017, the entire contents each of which are incorporated herein by reference.

BACKGROUND

The present disclosure relates generally to the field of building automation systems. A building automation system (BAS) is, in general, a system of devices configured to control, monitor, and manage equipment in or around a building or building area. A BAS can include, for example, an HVAC system, a security system, a lighting system, a fire alerting system, any other system that is capable of managing building functions or devices, or any combination thereof.

SUMMARY

One implementation of the present disclosure is a Building Automation System (BAS) platform comprising one or more processors configured to provide an operating environment for developing and executing a plurality of building automation and control microservices. At least one of the plurality of building automation and control microservices is configured to generate and output customer building configurations. At least one of the plurality of building automation and control microservices is configured to receive live data from remote building equipment and provide control signals to the remote building equipment. At least one of the plurality of building automation and control microservices is configured to maintain a library of one or more building automation and control applications configured to analyze the live data and generate the control signals. The BAS platform further includes one or more application programming interfaces configured to provide a framework for third-party developers to design the building automation and control applications that run within the operating environment and interact with one or more of the building automation and control microservices.

In some embodiments, the plurality of building automation and control microservices further includes at least one microservice configured to store and output regional building standards and models of the remote building equipment.

In some embodiments, the customer building configurations define relationships between building spaces and the remote building equipment.

In some embodiments, the plurality of building automation and control microservices further includes at least one microservice configured to authenticate users and manage building access.

In some embodiments, the plurality of building automation and control microservices further includes at least one microservice configured to maintain and process a live data cache of the live data from the remote building equipment.

In some embodiments, the plurality of building automation and control microservices further includes at least one microservice configured to provide an app store that enables the building automation and control applications to be tested, published, and made available for download by users of the BAS platform.

In some embodiments, the plurality of building automation and control microservices further includes at least one microservice configured as a central messaging backbone of the BAS platform.

In some embodiments, the plurality of building automation and control microservices further includes at least one microservice configured to provide search query functionality.

Another implementation of the present disclosure is a method for providing a Building Automation System (BAS) platform. The method includes configuring an operating environment for developing and executing a plurality of building automation and control microservices. The method further includes generating, by at least one of the building automation and control microservices, customer building configurations, wherein the customer building configurations define relationships between building spaces and building equipment. The method further includes receiving, by at least one of the building automation and control microservices, live data from the building equipment. The method further includes providing, by at least one of the building automation and control microservices, control signals to the building equipment. The method further includes maintaining, by at least one of the building automation and control microservices, a library of building automation and control applications configured to analyze the live data and generate the control signals. The method further includes providing, by at least one of the building automation and control microservices, one or more application programming interfaces configured to provide a framework for third-party developers to design the building automation and control applications that run within the operating environment and interact with one or more of the building automation and control microservices.

In some embodiments, the method further comprises storing, by at least one of the building automation and control microservices, regional building standards and models of the building equipment.

In some embodiments, the method further comprises generating, by at least one of the building automation and control microservices, user interfaces that allow users to interact with the BAS platform.

In some embodiments, the method further comprises providing, by at least one of the building automation and control microservices, search functionality that allows users of the BAS platform to perform search queries.

In some embodiments, the method further comprises maintaining, by at least one of the building automation and control microservices, an intent catalog including a plurality of user intents derived from the search queries.

In some embodiments, the method further comprises providing, by at least one of the building automation and control microservices, resource management to the building automation and control applications.

In some embodiments, the method further comprises maintaining, by at least one of the building automation and control microservices, a live data cache of the live data from the building equipment.

Another implementation of the present disclosure is a Building Automation System (BAS) platform comprising one or more processors configured to provide an operating environment for developing and executing a plurality of building automation and control microservices. At least one of the plurality of building automation and control microservices is configured to receive live data from remote building equipment and provide control signals to the remote building equipment. The BAS platform further includes one or more application programming interfaces configured to interact with third-party building automation and control applications that run within the operating environment.

In some embodiments, the plurality of building automation and control microservices includes at least one microservice configured to maintain and process a live data cache of the live data from the remote building equipment.

In some embodiments, the plurality of building automation and control microservices includes at least one microservice configured to authenticate users and manage building access.

In some embodiments, the plurality of building automation and control microservices includes at least one microservice configured to configured to store and output regional building standards and models of the remote building equipment.

In some embodiments, the plurality of building automation and control microservices includes at least one microservice configured as a central messaging backbone of the BAS platform.

DETAILED DESCRIPTION

Overview

Referring generally to the FIGURES, systems and method for providing a Building Automation System (BAS) platform are shown, according to various embodiments. The BAS platform may include one or more processors configured to provide a microservices platform for developing and executing a plurality of microservices. Each of the microservices may comprise an independently-deployable and independently-scalable service. Each of the microservices may be configured to provide a contract that defines a protocol for communicating with other microservices. The microservices platform may provide one or more application programming interfaces used to build applications on top of the microservices platform. In some embodiments, the BAS platform includes a standards and models service, a customer building configuration service, a data management service, an application platform service, a supervisory control service, an search query service, and a customer user interface service.

Building Automation System and HVAC System

Figure 1:
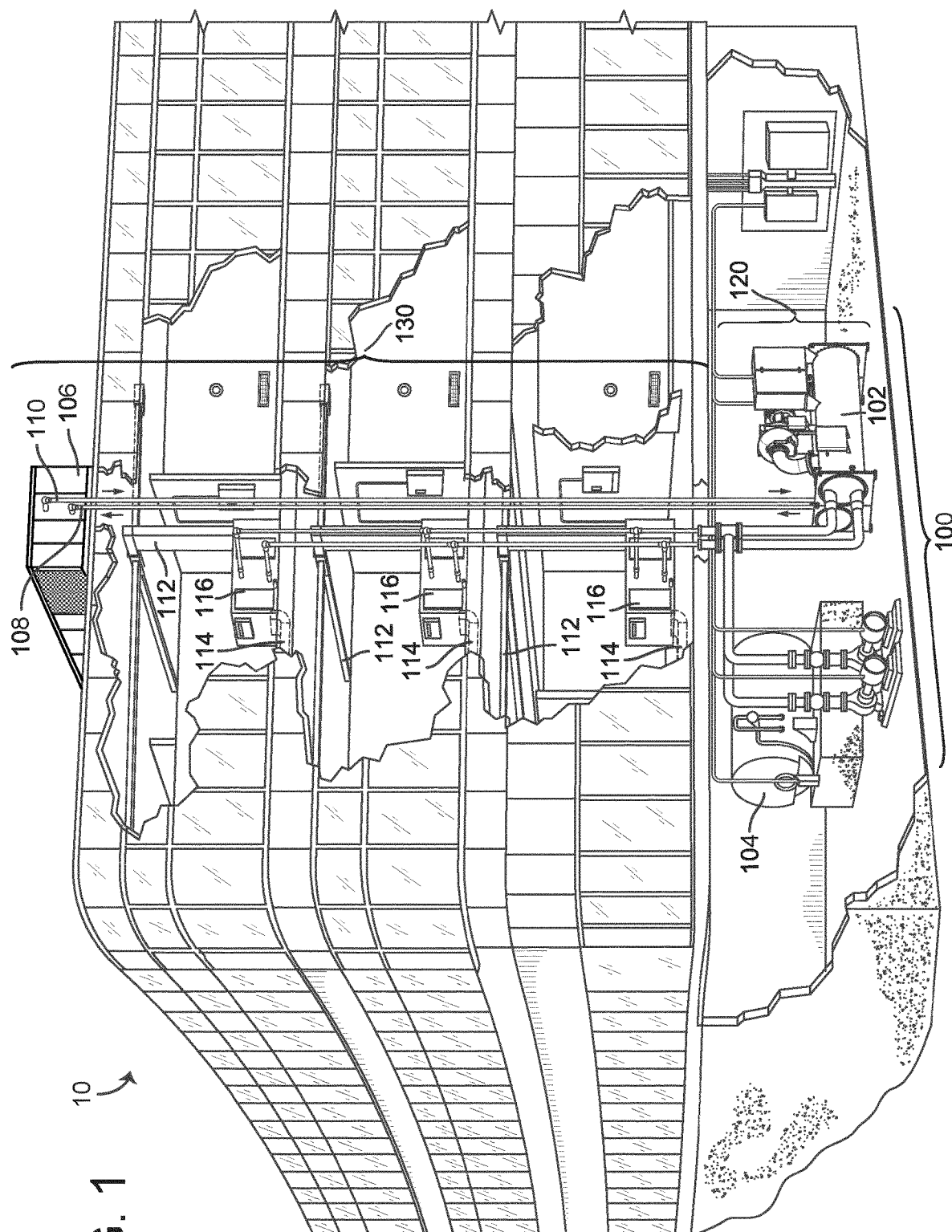
FIG. 1 is a drawing of a building equipped with a Building Automation System (BAS) and a HVAC system, according to some embodiments.

Referring now to FIGS. 1-4, an exemplary building management system (BMS) and HVAC system in which the systems and methods of the present disclosure can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. The terms BMS and BAS (i.e., building automation system) are used synonymously throughout this disclosure.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Figure 2:
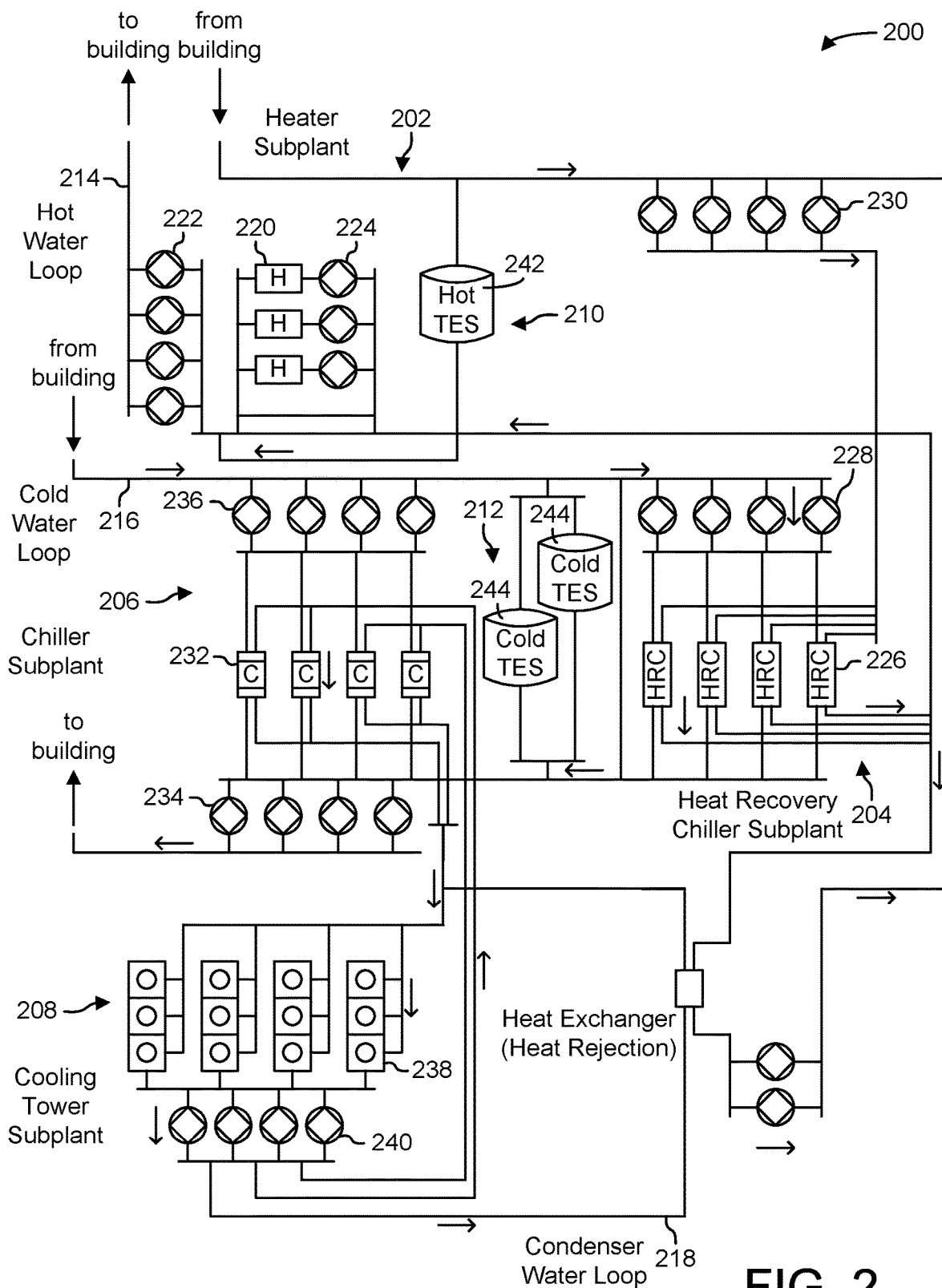
FIG. 2 is a schematic of a waterside system which can be used as part of the HVAC system of FIG. 1, according to some embodiments.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
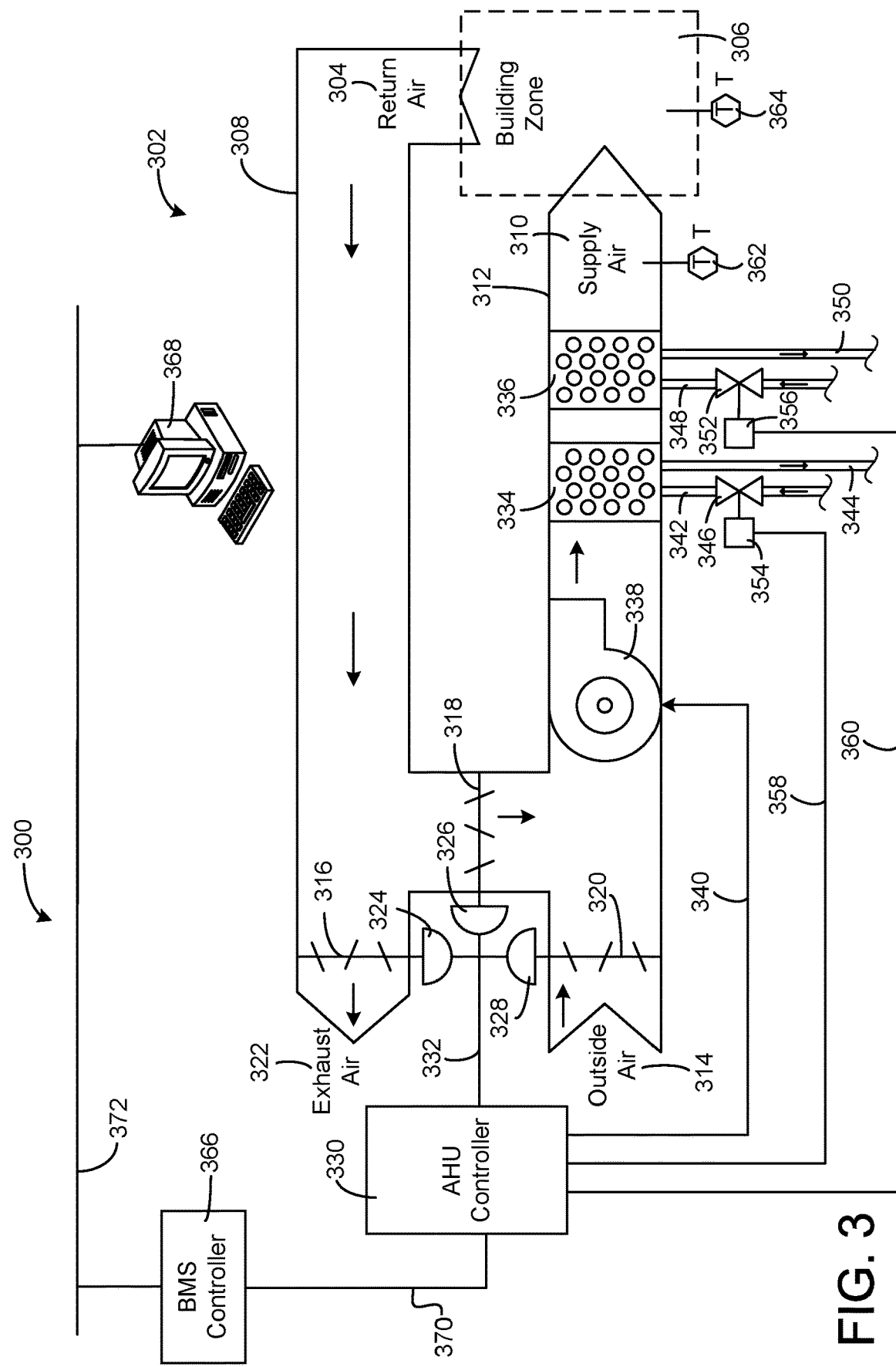
FIG. 3 is a block diagram of an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BAS Controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BAS Controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BAS Controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BAS Controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BAS Controller 366 can be separate (as shown in FIG. 3) or integrated. In an integrated implementation, AHU controller 330 can be a software module configured for execution by a processor of BAS Controller 366.

In some embodiments, AHU controller 330 receives information from BAS Controller 366 (e.g., commands, setpoints, operating boundaries, etc.) and provides information to BAS Controller 366 (e.g., temperature measurements, valve or actuator positions, operating statuses, diagnostics, etc.). For example, AHU controller 330 can provide BAS Controller 366 with temperature measurements from temperature sensors 362-364, equipment on/off states, equipment operating capacities, and/or any other information that can be used by BAS Controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BAS Controller 366 and/or AHU controller 330 via communications link 372.

Figure 4:
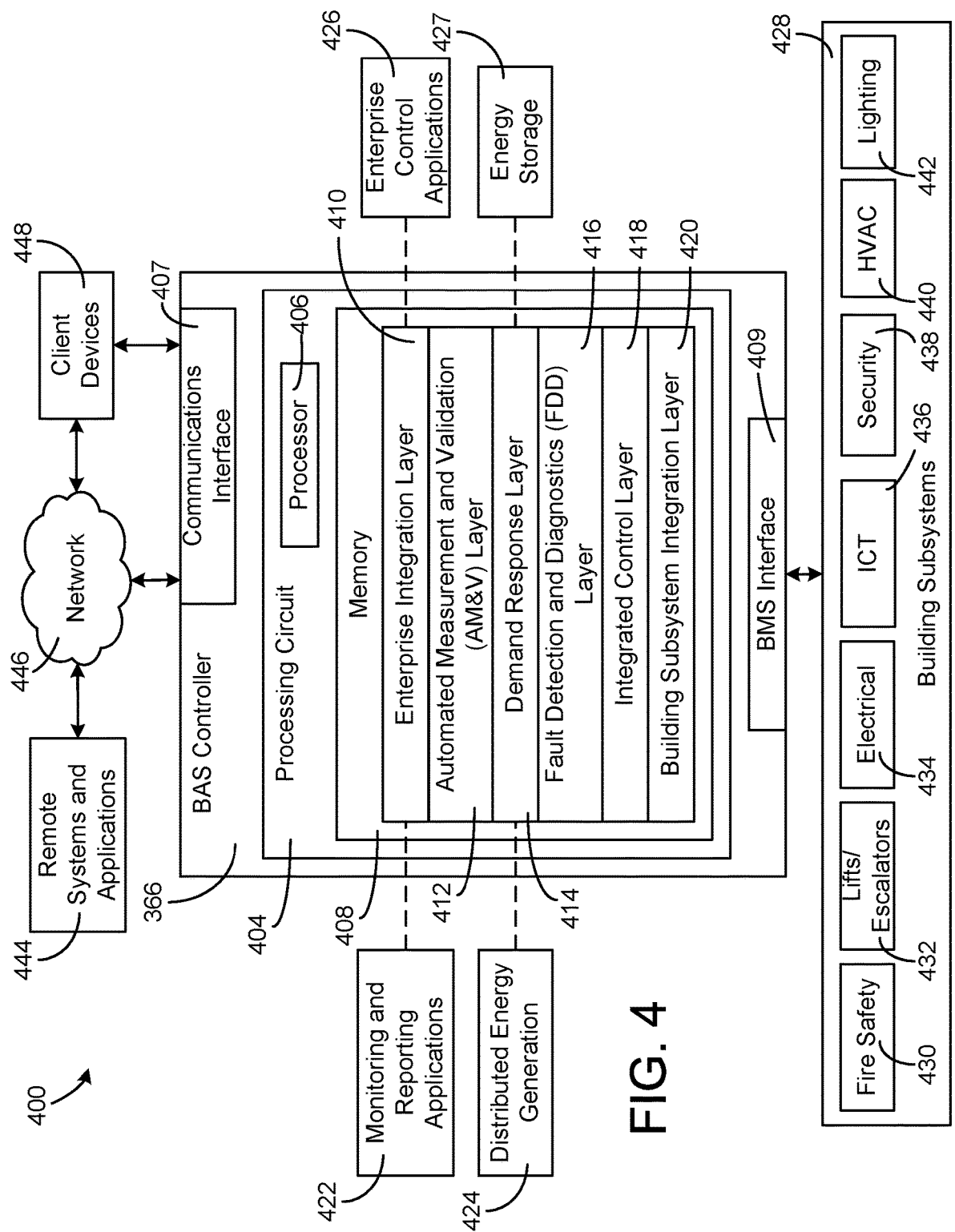
FIG. 4 is a block diagram of a BAS which can be used in the building of FIG. 1, according to some embodiments.

Referring now to FIG. 4, a block diagram of a building automation system (BAS) 400 is shown, according to an exemplary embodiment. BAS 400 can be implemented in building 10 to automatically monitor and control various building functions. BAS 400 is shown to include BAS Controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BAS Controller 366 is shown to include a communications interface 407 and a BMS interface 409. Interface 407 can facilitate communications between BAS Controller 366 and external applications (e.g., monitoring and reporting applications 422, enterprise control applications 426, remote systems and applications 444, applications residing on client devices 448, etc.) for allowing user control, monitoring, and adjustment to BAS Controller 366 and/or subsystems 428. Interface 407 can also facilitate communications between BAS Controller 366 and client devices 448. BMS interface 409 can facilitate communications between BAS Controller 366 and building subsystems 428 (e.g., HVAC, lighting security, lifts, power distribution, business, etc.).

Interfaces 407,409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BAS Controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BAS Controller 366 is implemented within a single computer (e.g., one server, one housing, etc.). In various other embodiments BAS Controller 366 can be distributed across multiple servers or computers (e.g., that can exist in distributed locations). Further, while FIG. 4 shows applications 422 and 426 as existing outside of BAS Controller 366, in some embodiments, applications 422 and 426 can be hosted within BAS Controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BAS 400.

Enterprise integration layer 410 can be configured to serve clients or local applications with information and services to support a variety of enterprise-level applications.

For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BAS Controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BAS Controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BAS Controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand set-point before returning to a normally scheduled set-point, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the set-point for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include set-point or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BAS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its set-point. These processes can be examined by FDD layer 416 to expose when the system begins to degrade in performance and alert a user to repair the fault before it becomes more severe.

BAS Microservices

Figure 5:
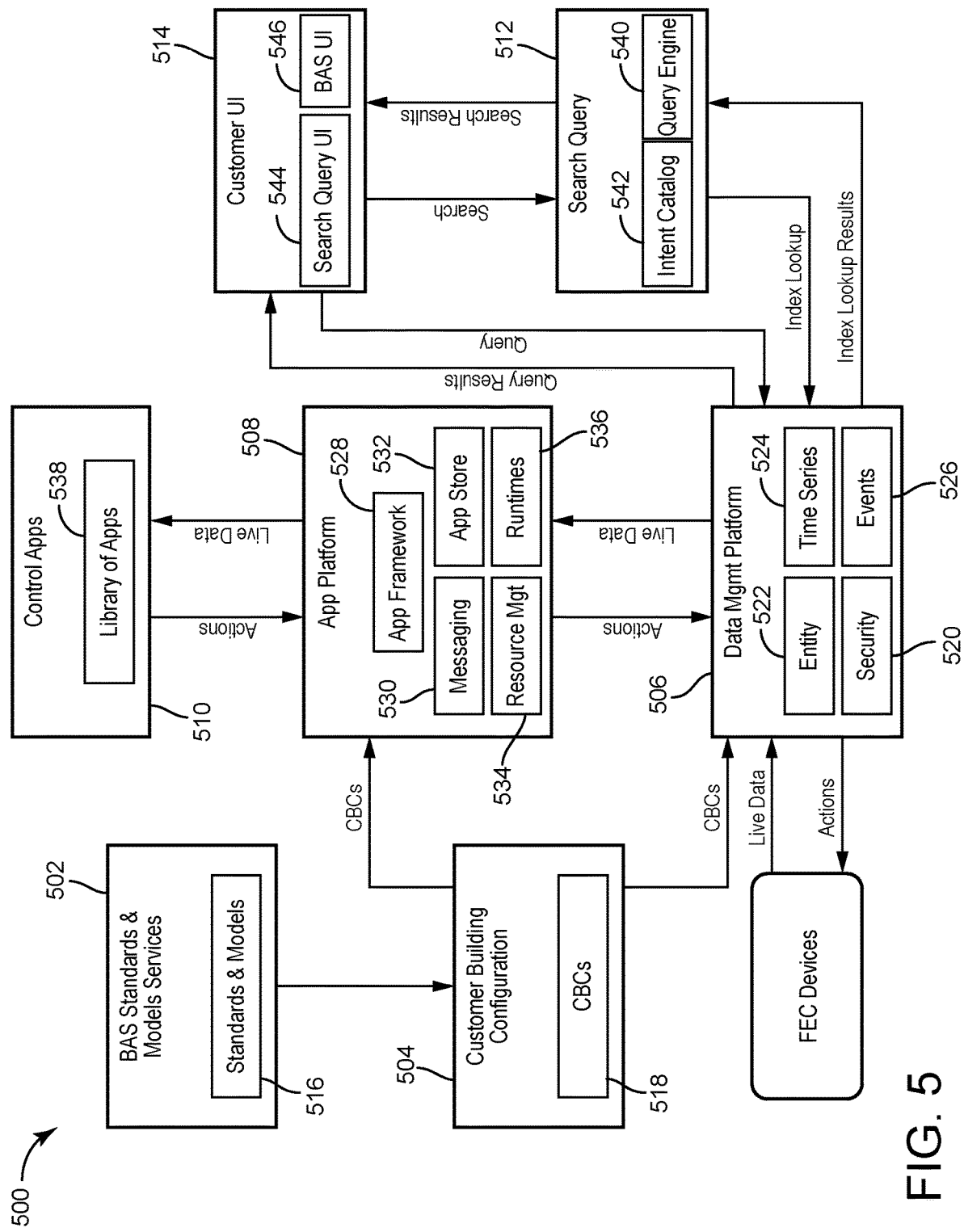
FIG. 5 is a block diagram illustrating a BAS platform, according to some embodiments.

Referring now to FIG. 5, a block diagram of a BAS platform 500 is shown, according to some embodiments. The platform 500 may be an environment in which software associated with a BAS (e.g., BAS 400) is executed. In some embodiments, platform 500 is configured to provide a plurality of microservices. Each microservice may comprise an independently-deployable and independently-scalable service. In some embodiments, each microservice is developed and executed in an environment defined by platform 500. Platform 500 may define various protocols, interfaces, and development kits that can be used to build applications and other software on top of platform 500. Each microservice may be configured to provide a contract that defines a protocol for communicating with other microservices. The microservices may be configured to allow for messaging-based invocations. In some embodiments, the microservices may be configured to operate via one or more RESTful Application Program Interfaces (REST APIs). However, other types of APIs are also contemplated. In some embodiments, real-time data services will be performed using messaging-based invocation, while other services may be executed using API level interactions.

In some embodiments, platform 500 is associated with one or more physical servers (1 to N) in a central location (e.g., on-site). Normal operation of platform 500 may be conducted via the physical servers while routine maintenance and updates of software may be performed via cloud-based services (e.g., via network 446). Operations that may be performed via cloud-based services include updates to standards and models, updates to customer configurations, deployment of new applications (e.g., developed by third parties), new features, and general system upgrades released over time. In alternative embodiments, general operation of platform 500 may be performed via both physical servers (e.g., on-site) as well as via services deployed on the cloud. For example, some of the microservices provided by platform 500 may be deployed via on-site servers while other microservices provided by platform 500 may be provided via interaction with off-site servers (e.g., cloud computing).

Platform 500 is shown to include a Standards and Models Service 502, a Customer Building Configuration Service 504, a Data Management Service 506, an Application Platform Service 508, a Supervisory Control Service 510, a Search Query Service 512, and a Customer User Interface (UI) Service 514. However, more, less, modified, and/or different microservices are also contemplated.

Standards and Models Service 502 may be hosted on the cloud (e.g., network 446). In some embodiments, Standards and Models Service 502 is hosted on cloud storage (e.g., a "master") and customer-specific instances of Service 502 are created during customer deployment. Standards and Models Service 502 may be used to store one or more standards initiatives for use with BAS 400. For example, Standards and Models Service 502 may store BAS specific initiatives (e.g., Brick+ initiatives). In some embodiments, Standards and Models Service 502 also stores regional standards (e.g., California Building Standards). Standards and Models Service 502 may further receive inputs from one or more designers related to defining and maintaining equipment models associated with one or more BAS devices such as described above with respect to BAS 400. Standards and Models Service 502 may output data through Standards and Models API 516. Standards and Models API 516 may be a REST API that outputs data in JSON format, for example. A web-based tool may be used with Standards and Models Service 502 to allow for creation and maintenance of Standards and Models Service 502. The web-based tool may be configured to support maintenance of Standards and Models API 516, maintenance of metadata relationships and definitions (e.g., Brick Schema), maintenance of regional standards, and maintenance of equipment models (e.g. AHU models, VAV/VMA models, Chiller models, etc.).

Customer Building Configuration Service 504 may be configured to generate one or more Customer Building Configurations (CBCs) 518. For example, Customer Building Configuration Service 504 may provide a user interface (e.g., editor tool) to assist customers in properly configuring a BAS for a building. Customer Building Configuration Service 504 may then output a CBC for the building. In some embodiments, Customer Building Configuration Service 504 receives inputs from Standards and Models Service 502. CBCs 518 may include a description of one or more spaces (e.g., floors, rooms, zones, etc.) within a building and the relationships between them. For example, a CBC 518 may define that a campus '507' hasPart building 'B1' (and inversely, building 'B1' isPartOf campus '507'). A CBC 518 may also define that building 'B1' hasPart floor 'B1-F1' and floor 'B1-F1' hasPart room 'B1-F1 E-Interview.' A CBC 518 may further include descriptions of building equipment such as AHUs, VAVs, Sensors, Chillers, Boilers, etc. For example, a CBC 518 may define that 'VAV-23' has Point 'Point-46573: zone air temperature setpoint' or 'VAV-23' hasPoint 'Point-45674: damper position.' A CBC 518 may also include a description of relationships between building equipment. For example, a CBC 518 may define that 'AHU-1' feeds 'VAV-23.' A CBC 518 may further describe relationships between building spaces and building equipment. For example, room 'B1-F1 E-interview' contains occupancy sensor 'OS-45.' A CBC 518 may also include a description of relationships between applications and zoning systems based on a defined sequence of operations. For example, zoning system 'ZS-1' controls 'AHU-1' and zoning system 'ZS-1' controls 'VAV-23' and 'VAV-24' while supervisory control app 'Flow Reset App' controls zoning system 'ZS-1.' Other examples include supervisory control app 'Flow Reset App' hasInput 'Point-45674: damper position' or supervisory control app 'Flow Reset App' hasOuput 'Point-32674: duct static pressure setpoint.' Table 1 shown below further describes relationships and functions that can be implemented in CBCs 518 generated by Customer Building Configuration Service 504.

viduals to access appropriate resources at appropriate times and for appropriate reasons (e.g., authenticating users, providing access tokens with rights and claims, preventing unauthorized access, etc.). Entity service 522 may be configured to store spaces, equipment, and points associated with BAS 400.

Time series sub-service 524 may be configured to store and process/transform time series data (e.g. sensor readings). Time series sub-service 524 may also be configured to provide a "live data cache" that includes the most recent data from all points associated with a BAS. In some embodiments, the live data cache may prepare data to be read by one or more applications and services associated with platform 500. Time series sub-service 524 may further be configured to poll equipment points at regular intervals to receive updated measurements from building equipment. Time series data may be fully indexed based on fields and tags available to time series sub-service 524 (e.g., document retrieval based on a tag). Time series processing may include cleansing operations (e.g., adaptive data pike cleanse), gap filling operations (e.g., hold last value fill), aggregation operations (e.g., hourly average), math operations (e.g., add, sub, etc.), compare operations (e.g., greater than, less than, etc.), logic operations (e.g., AND, OR, NOT, etc.), conditional operations (e.g., mask/where/if), statistical operations, and/or windowing operations (e.g., sliding windows, moving averages, tumbling windows, etc.).

Events sub-service 526 may be configured to create, update and read events. Each event can be stored in a document and indexed based on tags available in the document. The index may serve the reads of a tagging service (e.g., document retrieval based on a tag). An event may be a set of related incidents and actions related to those incidents over a defined period of time. For example, an alarm event such as 'high temperature alarm' in room 'B4-F2-S conference room' may be initiated at 11:23:05 AM and continue till 11:45:19 AM on Jan. 27, 2017. To resolve the

TABLE 1

| Relationship/ Inverse | Transitive? | Definition | Endpoints |
|---|---|---|---|
| Contains/ isLocatedIn | Yes | A physically encapsulates B | Location/Sensor Location/Equipment |
| Controls/ isControlledBy | No | A determines of affects the internal state of B | Function Block/ Equipment |
| hasPart/ isPartOf | Yes | A has some component or part B (typically mechanical) | Equipment/Sensor Equipment/Equipment Location/Location |
| hasPoint/ isPointOf | No | A is measure by or is otherwise represented by point B | Equipment/Sensor Location/Sensor |
| Feeds/ isFedBy | Yes | A "flows" or is connected to B | Function Block/ Equipment Equipment/Equipment |
| hasInput/ isInputOf | No | Function A has an input B | Function Block/ Sensor |
| hasOutput/ isOutputOf | No | Function A has an output B | Function Block/ Sensor |

Data Management Service 506 may be configured to manage data associated with other microservices provided via platform 500. Data Management Service 506 is shown to communicate with building equipment to receive live data and send actions (e.g., control decisions). Data Management Service 506 may include multiple sub-services such as a security and identity management sub-service 520, an entity sub-service 522, a time series sub-service 524, and an events sub-service 526. Security and identity management sub-service 520 may be configured to enable authorized indialarm event, a building manager may acknowledge the alarm at 11:29:43 AM and take one or more actions to resolve the alarm resulting in the alarm being deactivated at 11:45:19 AM. All of these actions associated with the alarm event may be created, updated, and read by events sub-service 526.

Data Management Service 506 may also include a connectivity sub-service, a device management sub-service, an actuation sub-service, a tagging sub-service, a notification sub-service, and/or a reporting sub-service. The connectivity sub-service may be configured to enable connectivity between devices, such as Internet of Things (IoT) devices and an IoT hub. The connectivity sub-service may further be configured to enable secure connections between devices, servers, networks, controllers, etc. The device management sub-service may be configured to maintain a library of communication drivers, such as BACnet or Modbus drivers, to enable communication with devices associated with a BAS. The actuation sub-service may be configured to operate as a centralized agency that can manage all writes to points of devices within a BAS. Supervisory Control Service 510 may be configured to use the actuation sub-service when writing a value to a point on one or more devices, for example. The tagging sub-service may enable applications to attach tags to entities, time series data, and/or events. The tagging service can further enable the retrieval of entities, time series data, and events related to a specific tag.

Data Management Service 506 may receive inputs from Standards and Models Service 502, CBCs 518 from Customer Building Configuration Service 504, as well as operational data. Data Management Service 506 may output data (e.g., processed time series data) to Supervisory Control Service 510 which may then write data to equipment using the actuation sub-service and create/update events using the events sub-service 526, for example. Data Management Service 506 may further output data to Customer UI Service 514 which may use security sub-service 520 to authenticate users and manage access, use entity sub-service 522 and time series sub-service 524 to receive data for customer reports, and use events sub-service 526 to get data for displaying event reports, for example. Data Management Service 506 may further output to Search Query Service 512 which may use entity, time series, and event data indices to identify matching documents to serve user queries.

Application Platform Service 508 can provide a protocol for one or more applications to be developed and executed on top of platform 500. For example, in distributed or cloud-based systems, supervisory controllers may not exist within BAS 400 and thus may require supervisory applications (e.g., defined by Supervisory Control Service 510). These applications as well as other apps associated with BAS 400 are generally created using LCT logic (e.g., created using a logic connector tool) and are run on an ORE (e.g., output relay electrical function module). However, Application Platform Service 508 may run the ORE on a service and applications that can be run on the ORE can be run on the server ORE. Application Platform Service 508 may also support other methods of creating, deploying and running applications.

Application Platform Service 508 may include sub-services such as an application framework sub-service 528, a messaging sub-service 530, an app store sub-service 532, a resource management sub-service 534, and an application runtime sub-service 536. The application framework sub-service 528 may include a software library to support the development of applications built on top of platform 500 (e.g., supervisory control apps managed by service 510). Messaging sub-service 530 may be configured as a central messaging backbone for platform 500. In some embodiments, messaging sub-service 530 is implemented using a Pub-Sub messaging pattern. App store sub-service 532 may be configured to enable applications to be tested and published in an app store accessible by all users of BAS 400. In one embodiment, app store 532 is a Johnson Controls app store. Once published, applications may become available to customers for download, installation, trial, and purchase. Resource management sub-service 534 may be configured as a centralized resource management service. Resource management sub-service 534 may be configured to monitor and manage dynamic allocation of cluster resources to improve utilization, for example. Applications may be configured to use resource management sub-service 534 to request system resources. In some embodiments, containers are used for resource allocation. Application runtime sub-service 536 may be configured to provide runtime environments for applications to run on. For example, if an app is created using LCT logic, the app may be run in the ORE. However, if the app is created in a programming language such as Python, Java, or C#, the app may need to be executed in a container designed to support the appropriate runtime. Application Platform Service 508 may further include one or more Application Development Kits. The Application Development Kits may be utilized to crate and test various supervisory control and other applications. The ability to build a wide variety of applications on top of BAS platform 500 opens the door for many possible developments in the building automation industry.

Supervisory Control Service 510 may be configured to store and/or execute one or more supervisory control applications to provide supervisory control to one or more devices within BAS 400. Supervisory Control service 510 may contain a library of apps 538. Library 538 may include a variety of apps including global data sharing apps, temporary occupancy override apps, scheduled exception apps, flow reset apps, optimal start/stop apps, reheat valve control apps, unoccupied mode night setback app, reporting apps, chiller sequencing apps, optimization service apps, alarm and event management apps, and fault detection/diagnostics apps. Fault detection/diagnostics apps may be configured to provide fault detection and diagnostics for AHUs, VAVs, chillers, valves, actuators, and other equipment managed by BAS 400.

Inputs to Supervisory Control Service 510 may include algorithms from control domain experts, CBCs 518 from Customer Building Configuration Service 504, and/or data from Data Management Service 506. Outputs from Supervisory Control Service 510 may include actuation performed using the actuation sub-service logged as events and analytics which may be stored as events and made available in the customer UI service 514.

Search Query Service 512 may be configured to provide search query functionality users of BAS 400. Search Query Service 512 may include a query execution engine 540 and an intent catalog 542. Query execution engine 540 may be configured to perform various filtered index lookups and compile results. Intent catalog 542 may include a catalog of "user intents" (e.g., canned queries) expressed as a variety of search queries and display templates for each of the "user intents."

Figure 6:
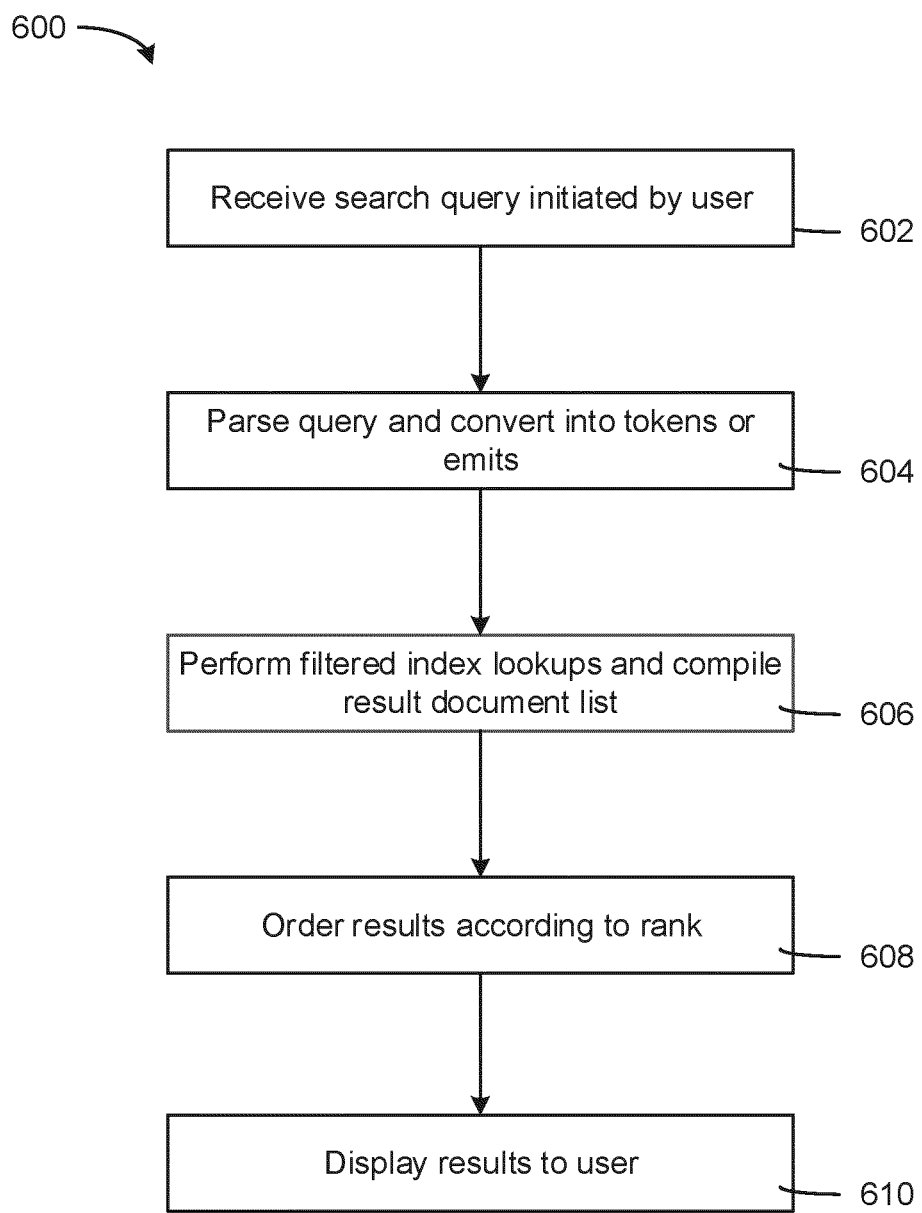
FIG. 6 is a flowchart illustrating a search query process associated with the platform of FIG. 5, according to some embodiments.

Turning now to FIG. 6, a flow diagram illustrating a search query process 600 performed by a user of BAS 400 is shown, according to some embodiments. At step 602, a user may begin a search. In some embodiments, the user performs the search using Search Query UI 544 associated with the Customer UI service 514. At step 604, a query parser associated with Search Query Service 512 parses the search query and converts the query into a set of index lookups such as "tokens" or "emits." The tokens or emits may then be provided to query execution engine 540 which may perform various filtered index lookups and compile a result document list (step 606). In some embodiments, query execution engine 540 may access one or more databases containing various document indices used to compile the result document list. At step 608, a result ranker may order the results contained in the result document list based on a rank matched with the query. For example, the results may be ranked according to a measure of relevance to the search query. At process 610 the results are displayed to the user. In some embodiments, the results are displayed via Customer UI Service 514.

Inputs to Search Query Service 512 may be received from Standards and Models Service 502 and Customer Building Configuration Service 504, for example. Inputs may also include a pre-defined set of 'user intents' or 'canned queries' the system is expected to be able to answer along with expected results and a display template for these results. A further input may include indices from Data Management Service 506 which may be used for performing index lookups. Outputs from Search Query Service 512 may include a ranked sets of results for search queries along with a display template for the results.

Customer UI Service 514 may be configured to provide user interfaces to users of BAS platform 500. Customer UI service 514 may include Search Query UI 544 and a BAS User Interface 546. BAS User Interface 546 can provide a user interface for users accessing BAS 400 using a BAS control program (e.g., Metasys from Johnson Controls, Inc.). Inputs to Customer UI Service 514 may be provided from one or more users. For example, a user may provide inputs such as user personal preferences (e.g. which interfaces they wish to have enabled), user queries through a structured reporting interface (e.g., requests for specific reports), and user search queries through Search Query Service 512. Customer UI Service 514 may access Data Management Service 506 to retrieve data for specific reports. Further, Customer UI Service 514 may access Search Query Service 512 to retrieve search results. Outputs of Customer UI service 514 may include structured reports (e.g., graphs, tables) generated in response to a user request and search results in response to search queries initiated via Search Query UI 544.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A Building Automation System (BAS) platform comprising a processing circuit comprising one or more processors and memory storing instructions that, when executed by the one or more processors, cause the one or more processors to:
provide an operating environment for developing and executing a plurality of building automation and control microservices, the building automation and control microservices comprising a plurality of independently deployable and independently scalable building services configured to build applications for building services,
wherein the building automation and control microservices include:
at least one microservice configured to generate and output customer building configurations;
at least one microservice configured to store and output building standards and models of building equipment; and
at least one microservice configured to maintain a library of one or more building automation and control applications configured to analyze data and generate control signals.

2. The BAS platform of claim 1, wherein the customer building configurations define relationships between building spaces and remote building equipment.

3. The BAS platform of claim 1, wherein the plurality of building automation and control microservices further includes at least one microservice configured to authenticate users and manage building access.

4. The BAS platform of claim 3, wherein the plurality of building automation and control microservices further includes at least one microservice configured to maintain and process a live data cache of live data from remote building equipment.

5. The BAS platform of claim 1, wherein the plurality of building automation and control microservices further includes at least one microservice configured to provide an app store that enables the building automation and control applications to be tested, published, and made available for download by users of the BAS platform.

6. The BAS platform of claim 5, wherein the plurality of building automation and control microservices further includes at least one microservice configured as a central messaging backbone of the BAS platform.

7. The BAS platform of claim 1, further comprising one or more application programming interfaces configured to provide a framework for third-party developers to design the building automation and control applications that run within the operating environment and interact with one or more of the building automation and control microservices.

8. A method for providing a Building Automation System (BAS) platform, the method comprising:
    providing an operating environment for developing and executing a plurality of building automation and control microservices, the building automation and control microservices comprising a plurality of independently deployable and independently scalable building services configured to build applications for building services;
    receiving, by at least one of the building automation and control microservices, data from building equipment; and
    providing, by at least one of the building automation and control microservices, control signals to the building equipment;
    generating and outputting, by at least one of the building automation and control microservices, customer building configurations;
    storing and outputting, by at least one of the building automation and control microservices, building standards and models of the building equipment; and
    maintaining, by at least one of the building automation and control microservices, a library of one or more building automation and control applications configured to analyze data and generate the control signals.

9. The method of claim 8, further comprising providing, by at least one of the building automation and control microservices, one or more application programming interfaces configured to provide a framework for third-party developers to design the building automation and control applications that run within the operating environment and interact with one or more of the building automation and control microservices.

10. The method of claim 8, further comprising providing, by at least one of the building automation and control microservices, search functionality that allows users of the BAS platform to perform search queries.

11. The method of claim 10, further comprising maintaining, by at least one of the building automation and control microservices, an intent catalog including a plurality of user intents derived from the search queries.

12. The method of claim 8, further comprising providing, by at least one of the building automation and control microservices, resource management to the building automation and control applications.

13. The method of claim 8, further comprising maintaining, by at least one of the building automation and control microservices, a live data cache of the data from the remote building equipment.

14. A non-transitory computer-readable storage memory having computer-executable instructions stored thereon that, when executed by one or more processors of a Building Automation System (BAS), cause the BAS to perform operations comprising:
    providing an operating environment for developing and executing a plurality of building automation and control microservices, the building automation and control microservices comprising a plurality of independently deployable and independently scalable building services configured to build applications for building services,
    wherein at least one of the plurality of building automation and control microservices is configured to maintain a library of one or more building automation and control applications configured to analyze data and generate control;
    at least one of the plurality of building automation and control microservices is configured to generate and output customer building configurations; and
    at least one of the plurality of building automation and control microservices is configured to store and output building standards and models of building equipment.

15. The media of claim 14, wherein the plurality of building automation and control microservices includes at least one microservice configured to maintain and process a live data cache of live data received from remote building equipment.

16. The media of claim 14, wherein the plurality of building automation and control microservices includes at least one microservice configured to authenticate users and manage building access.

17. The media of claim 14, further comprising one or more application programming interfaces configured to provide a framework for third-party developers to design the building automation and control applications that run within the operating environment and interact with one or more of the building automation and control microservices.

* * * * *